(12) United States Patent
Guerret et al.

(10) Patent No.: US 8,383,748 B2
(45) Date of Patent: Feb. 26, 2013

(54) CAST ACRYLIC PLATES WITH ENHANCED SHOCKPROOFNESS

(75) Inventors: Olivier Guerret, La Tour de Salvagny (FR); Jean-Yves Chenard, Pau (FR); Yannick Ederle, Paris (FR)

(73) Assignee: Arkema France, Colombes (FR)

( * ) Notice: Subject to any disclaimer, the term of this patent is extended or adjusted under 35 U.S.C. 154(b) by 789 days.

(21) Appl. No.: 11/721,238

(22) PCT Filed: Dec. 9, 2005

(86) PCT No.: PCT/FR2005/003087
§ 371 (c)(1),
(2), (4) Date: Aug. 13, 2009

(87) PCT Pub. No.: WO2006/061523
PCT Pub. Date: Jun. 15, 2006

(65) Prior Publication Data
US 2009/0306301 A1  Dec. 10, 2009

Related U.S. Application Data

(60) Provisional application No. 60/647,056, filed on Jan. 26, 2005.

(30) Foreign Application Priority Data

Dec. 10, 2004  (FR) .................................... 04 13186

(51) Int. Cl.
*C08F 118/02* (2006.01)

(52) U.S. Cl. ......... 526/319; 525/330.3; 525/71; 525/94; 525/98

(58) Field of Classification Search .................. 526/319
See application file for complete search history.

(56) References Cited

U.S. PATENT DOCUMENTS
2006/0063891 A1   3/2006   Ruzette et al.

FOREIGN PATENT DOCUMENTS
FR          2 852 961        9/2003
WO       WO 03/062293    *  7/2003

* cited by examiner

*Primary Examiner* — Doris Lee
(74) *Attorney, Agent, or Firm* — Thomas F. Roland

(57) ABSTRACT

Process for the preparation of impact-strengthened cast PMMA sheets comprising the following stages:
1. a mixture comprising:
    at least one alkoxyamine $Z(-T)_n$, in which Z denotes a polyvalent group and n an integer greater than 2, preferably of between 2 and 10, advantageously between 2 and 8, and
    the monomer(s) intended to form a central block B
    is heated to a temperature sufficient to activate the alkoxyamine and polymerize the monomer(s);
2. the central block B, optionally mixed with the unconsumed monomer(s) from stage 1, is reactivated in the presence of the monomer(s) intended to form the branches A;
3. MAM and optionally at least one comonomer M which can be copolymerized by the radical route with MMA and at least one radical initiator are added to the mixture obtained in stage 2;
4. the mixture from stage 3 is cast in a mould and then heated.

14 Claims, 4 Drawing Sheets

CAST ACRYLIC PLATES WITH ENHANCED SHOCKPROOFNESS

This application claims benefit, under U.S.C. §119 or §365 of PCT application
PCT/FR2005/003087 filed Dec. 9, 2005; French application number FR 04.13186 filed Dec. 10, 2004; and U.S. application No. 60/647,056 filed Jan. 26, 2005.

FIELD OF THE INVENTION

The present invention relates a process for the manufacture of impact-strengthened cast acrylic sheets. It also relates to cast sheets per se and to their uses.

BACKGROUND OF THE INVENTION

Polymethyl methacrylate (PMMA) is a material valued for its excellent optical properties (in particular the gloss and a high transparency with a transmission of visible light of at least 90%). However, it is also a brittle thermoplastic material which is sensitive to impacts. This characteristic is related to the fact that the glass transition temperature of PMMA is approximately 110° C., so that, in this material, the polymer chains are not capable of easily moving at ambient temperature. For some applications, it is therefore necessary to improve the impact strengthening of PMMA while retaining its transparency.

The impact strengthening of PMMA is generally improved by virtue of the introduction into the acrylic resin of an impact modifier of the type which is known as core-shell, which exists in the form of multilayer spherical particles. These particles are prepared by emulsion polymerization and are recovered in the powder form by atomization. They comprise a sequence of "hard" and "soft" layers. It is thus possible to encounter bilayer (soft-hard) or trilayer (hard-soft-hard) particles. In the case of cast acrylic sheets, obtained by polymerization of the mixture of monomers in a mould, the impact modifier is dispersed beforehand in the mixture of monomers. In the case of extruded acrylic sheets, the impact modifier is compounded in the extruder with the acrylic resin. In both cases, it is necessary for the impact modifier to be well dispersed in the acrylic resin in order to maintain a constant and homogeneous level of impact strength.

Application WO 01/57133 of the Applicant Company discloses a methacrylic (co)polymer strengthened by an impact modifier and by a grafted elastomeric copolymer. The impact modifier can be an additive of core-shell type or a block copolymer comprising at least one block obtained from a diene or from an alkyl or aralkyl (meth)acrylate. The grafted elastomeric copolymer is obtained from an elastomeric copolymer to which methacrylic (co)polymer groups are grafted in the pendent position. The impact strengthening thus results from the combination of two polymers, the impact modifier and the grafted elastomeric copolymer.

International Application WO 99/29772 discloses the impact strengthening of semi-crystalline thermoplastic resins using a styrene-butadiene-methyl methacrylate block copolymer (SBM).

International Application WO 02/055573 of the Applicant Company discloses the impact strengthening of a PMMA using a block copolymer of ABA type in which B denotes a central block obtained from a diene, for example an SBM.

International Application Wo 03/062293 of the Applicant Company discloses a process for the impact strengthening of a thermoplastic matrix using a B(-A)$_n$ block copolymer composed of a central block B and of n branches A and prepared using the controlled radical polymerization technique. This process applies to the strengthening of numerous thermoplastics (PS, PC, PVDF, and the like) and in particular to the manufacture of cast PMMA sheets.

According to this process, in a 1st stage, the central block B is prepared using a polyfunctional alkoxyamine. In a 2nd stage, the central block B is mixed with the monomer(s) intended to form the branches A, which results in the formation of the B(-A)$_n$ block copolymer. In this stage, a radical initiator can be added to the mixture, which results in the formation of a matrix. In a 3rd stage, the block copolymer B(-A)$_n$, optionally mixed with the matrix, is separated from the residual monomers by evaporation under vacuum at temperatures ranging up to 250° C. (stage referred to as desolventization stage). In a 4th stage, the block copolymer, thus freed from the residual monomers, can subsequently be extruded with a thermoplastic resin or else redissolved in a mixture of monomers, which is itself subsequently polymerized. On conclusion of this 4th stage, a block copolymer dispersed in a matrix is thus obtained.

The process of WO 03/062293, applied to the manufacture of cast sheets, is not capable of transfer to the industrial scale. This is because it exhibits the disadvantage of requiring a stage of desolventization, followed by a stage of redissolution of the copolymer. First, these two unit operations, by increasing the overall cycle time, affect the output of the process. Secondly, the desolventization stage is also capable of resulting in the formation of gels in the block copolymer, which affects its redissolution in the mixture of monomers and, consequently, can damage the transparency of the cast sheet.

Furthermore, according to the process disclosed, in particular in the examples, it is preferable, during the 2nd stage, to initiate the formation of the branches A at the same time as that of the matrix. For this, the monomer A is brought into contact with two types of initiators, the conventional radical initiator and the reactivatable central block. The monomer A is thus consumed at the same time according to two competing radical polymerization mechanisms, each exhibiting specific kinetics. The control of this 2nd stage is very difficult as it implies the harmonization of the rates of formation of the blocks A and of the matrix. This implies that it is necessary to adjust the nature of the radical initiator to the central block B and thus also to carefully adjust the temperature cycle. In practice, contradictory requirements are encountered and the possible compromises generally result:

in premature phase separation during the polymerization of the copolymer B(-A)$_n$, which migrates to the interface of the sheet and mould. In this case, sheets which are impossible to remove from the mould and/or which are partially or completely opaque are obtained;

in unacceptable contents of residual methyl methacrylate (MMA), which it is impossible to remove once the sheet is finished.

The Applicant Company has now improved the process for the preparation of impact-strengthened cast acrylic sheets disclosed in International Application WO 03/062293. The cycle time of this process is improved with respect to that disclosed in WO 03/062293 as it does not require any desolventization-redissolution stage. The process of the invention thus exhibits an improved productive output.

Furthermore, the radical initiator is added after and not during the formation of the block copolymer B(-A)$_n$, which facilitates the control of the polymerization and, consequently, makes it possible to avoid the formation of defects at the surface of the sheet, the formation of opaque regions due to the phase separation of the copolymer B(-A)$_n$ and the presence of an unacceptable amount of residual MMA.

The Applicant Company has also found, with surprise, that a very good transparency/impact strength compromise is obtained if the proportion of the central block B in the sheet is between 2 and 5%, preferably between 2.5 and 4.5%, more advantageously still between 2.6 and 4.0%.

According to an alternative form of the invention, the manufacture of cast sheets can also be envisaged starting from a block copolymer $B(-A)_n$ preformed elsewhere. For example, it is possible to envisage, for example for reasons of cost or logistics, preparing the copolymer on a production site other than that of the cast sheets, optionally even by another manufacturer. The process then comprises the following stages:
1. mixing the block copolymer $B(-A)_n$ with MMA and optionally with at least one comonomer M and with at least one radical initiator;
2. casting the mixture obtained in stage 1 in a mould and then heating it in order to obtain a cast sheet.

Preferably, the proportion by weight of the central block B in the sheet is between 2 and 5%, preferably between 2.5 and 4.5%, more advantageously still between 2.6 and 4.0%.

Furthermore, the block copolymer has a tendency to settle down inside the matrix to give homogeneously distributed particles. The particles exist in the form of substantially spherical nodules inside which one or more subnodule(s), having the same composition as the MMA homo- or copolymer, are present.

SUMMARY OF THE INVENTION

A first subject-matter of the invention is a process for the preparation of cast sheets made of PMMA strengthened with regard to impact comprising the following stages:
1. a mixture comprising:
    at least one alkoxyamine $Z(-T)_n$, in which Z denotes a polyvalent group and n an integer greater than 2, preferably of between 2 and 10, advantageously between 2 and 8, and
    the monomer(s) intended to form a central block B
    is heated to a temperature sufficient to activate the alkoxyamine and polymerize the monomer(s);
2. the central block B, optionally mixed with the unconsumed monomer(s) from stage 1, is reactivated in the presence of the monomer(s) intended to form the branches A;
3. MMA and optionally at least one comonomer M which can be copolymerized by the radical route with MMA and at least one radical initiator are added to the mixture obtained in stage 2;
4. the mixture from stage 3 is cast in a mould and then heated.

According to an alternative form of the invention, the process comprises the following stages:
1. a mixture is prepared comprising:
    a block copolymer $B(-A)_n$ composed of n branches A as defined in either of claims 4 and 5 and connected to their covalent bonds to a central block B as defined in either of claims 2 and 3, n denoting an integer of greater than or equal to 2, preferably between 2 and 10 and advantageously between 2 and 8
    MMA and
    optionally at least one comonomer M and at least one radical initiator;
2. the mixture obtained in stage 1 is cast in a mould and then it is heated in order to obtain a cast sheet.

Preferably, the content of central block B in the sheet is between 2 and 5%, preferably between 2.5 and 4.5%, more advantageously still between 2.6 and 4.0%.

The invention also relates to a sheet capable of being obtained according to the process or its alternative form.

The invention also relates to an MMA home- or copolymer in which particles of block copolymer $B(-A)_n$, existing the form of substantially spherical nodules inside which one or more subnodule(s) having the same composition as the MMA home- or copolymer are present, are homogeneously dispersed. It also relates to a cast sheet comprising such a homo- or copolymer. Finally, it relates to the use of the cast sheet in the manufacture of window panes, soundproof walls, flat screens, billboard or display devices.

DETAILED DESCRIPTION

Figure 1:
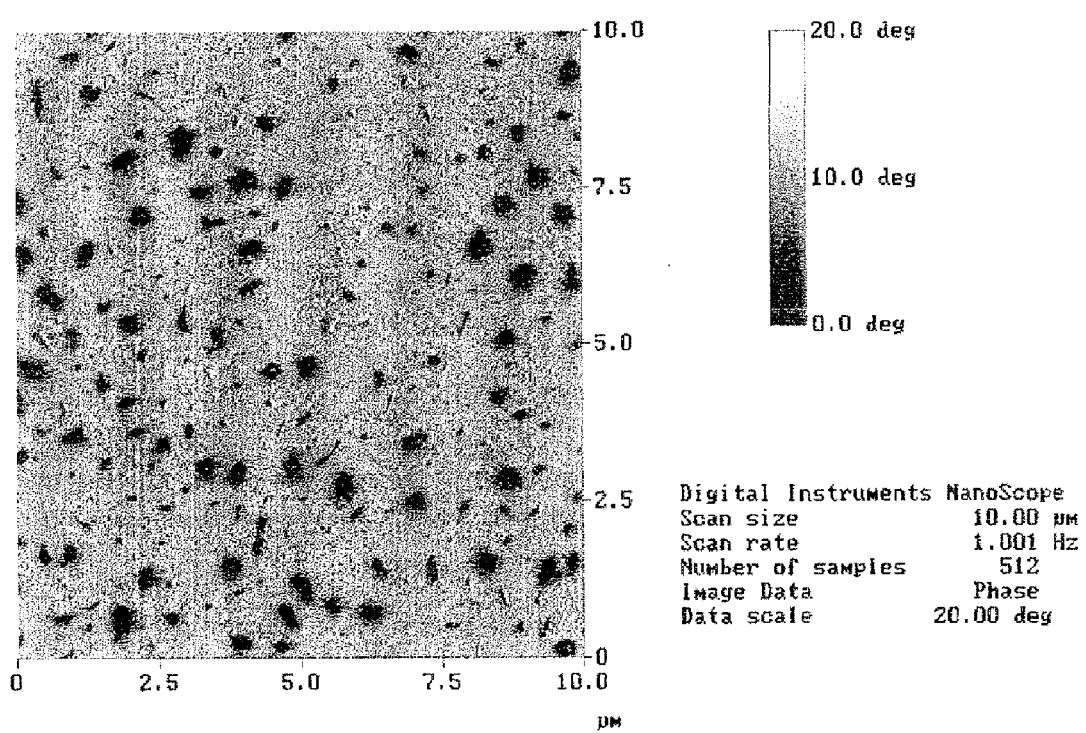
FIG. 1: is an atomic force microscopy image of Sheet 2 of the Examples.

As regards the block copolymer $B(-A)_n$, the latter is composed of n branches A connected via covalent bonds to a central block B, n denoting an integer greater than or equal to 2, preferably between 2 and 10 and advantageously between 2 and 8. The branches A can be identical or different, that is to say have identical or different average molecular weights and/or compositions.

According to the definition given by the IUPAC (see IUPAC Compendium of Chemical Terminology, 2nd edition (1997), 1996, 68, 2303), a block copolymer is composed of macromolecules having several chemically different polymer blocks, that is say derived from different monomers or also derived from the same monomers according to different distributions, which are connected to one another via covalent bonds. Reference may also be made to Kirk-Othmer Encyclopaedia of Chemical Technology, 3rd ed., vol. 6, p. 798, for further details with regard to copolymers this type. The block copolymer can be linear, star or comb (brush copolymer). Preferably, it is a linear copolymer, more preferably still a linear triblock copolymer of formula ABA (n=2). The block copolymer $B(-A)_n$ is different from the particles of core-shell type.

In the context of the invention, the copolymer can be a triblock copolymer with, in this case, n=2 (a central block and 2 branches). Examples of triblock copolymers can be PMMA-b-poly(n-butyl acrylate)-b-PMMA, PMMA-b-poly (n-butyl acrylate-co-styrene)-b-PMMA, PMMA-b-poly (isobutyl acrylate-co-styrene)-b-PMMA, poly(MMA-co-n-butyl acrylate)-b-poly(n-butyl acrylate-co-styrene)-b-poly (MMA-co-n-butyl acrylate) (b: symbol used to denote a block copolymer, co: symbol used to denote a random copolymer).

The block copolymer $B(-A)_n$ is prepared by the controlled radical polymerization technique using an alkoxyamine of formula $Z(-T)_n$. By this technique, the branches A are terminated by the nitroxide T, all or else in part. The branches can be terminated in part by the nitroxide T when, for example, a transfer reaction occurs between a nitroxide and an alkyl methacrylate, as indicated in the reaction below:

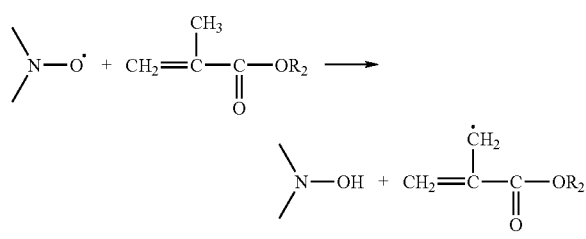

The block copolymer B(-A)$_n$ exhibits a weight-average molecular mass of between 30 000 and 300 000 g/mol, preferably between 35 000 and 300 000 g/mol. The polydispersity index is between 1.5 and 3.0, preferably between 1.8 and 2.7 and more preferably between 1.9 and 2.7.

As regards the central block B, the latter exhibits an overall glass transition temperature (recorded as $T_g$) of less than 0° C. Preferably, its weight-average mass is greater than 5000 g/mol, preferably greater than 20 000 g/mol and advantageously greater than 30 000 g/mol. It is preferably between 30 000 and 300 000 g/mol, advantageously between 50 000 and 250 000 g/mol.

The central block B is prepared from a mixture comprising at least one monomer chosen from:
acrylic monomers of formula $CH_2$=$CH$—$C$(=$O$)—$O$—$R_1$ where $R_1$ denotes a hydrogen atom or a linear, cyclic or branched $C_1$-$C_{40}$ alkyl group optionally substituted by a halogen atom or a hydroxyl, alkoxy, cyano, amino or epoxy group, such as, for example, acrylic acid, methyl, ethyl, propyl, n-butyl, isobutyl, tert-butyl, 2-ethylhexyl or glycidyl acrylate, hydroxy-alkyl acrylates or acrylonitrile;
methacrylic monomers of formula $CH_2$=$C(CH_3)$—$C$(=$O$)—$O$—$R_2$ where $R_2$ denotes a hydrogen atom or a linear, cyclic or branched $C_1$-$C_{40}$ alkyl group optionally substituted by a halogen atom or a hydroxyl, alkoxy, cyano, amino or epoxy group, such as, for example, methacrylic acid, MMA, ethyl, propyl, n-butyl, isobutyl, tert-butyl, 2-ethylhexyl or glycidyl methacrylate, hydroxyalkyl methacrylates or methacrylonitrile;
vinylaromatic monomers, such as, for example, styrene, substituted styrenes, α-methylstyrene, monochlorostyrene or tert-butylstyrene.

It is not prepared from a diene. A person skilled in the art knows how to combine these monomers so as to regulate the overall $T_g$ of the central block B. In order to obtain a $T_g$ of less than 0° C., it is necessary to use at least one monomer exhibiting a $T_g$ of less than 0° C., for example butyl acrylate or 2-ethylhexyl acrylate. The refractive index of the central block B is preferably as close as possible to that of the matrix in order to provide the best possible transparency.

The central block B can be composed solely of a monomer exhibiting a $T_g$ of less than 0° C., for example butyl acrylate or 2-ethylhexyl acrylate. The central block B can also be composed of at least one alkyl acrylate and of a vinylaromatic monomer. Advantageously, it is composed of butyl acrylate and of styrene in the butyl acrylate/styrene ratio by weight of between 70/30 and 90/10, preferably between 75/25 and 85/15.

As regards the branches A, the latter exhibit an overall $T_g$ of greater than 0° C. and are compatible with the MMA home- or copolymer.

Preferably, the weight-average mass of each branch A is between 15 000 and 1 000 000 g/mol, preferably between 25 000 and 500 000 g/mol, advantageously between 35 000 and 300 000 g/mol. Preferably, in order to improve the compatibility of the block copolymer B(-A)$_n$ with the methacrylic (co)polymer and the transparency of the sheet, the ratio by weight of the branches A to the central block B is greater than 1, preferably greater than 1.5.

Each branch A is prepared from a mixture comprising MMA and optionally at least one monomer chosen from:
acrylic monomers of formula $CH_2$=$CH$—$C$(=$O$)—$O$—$R_1$ where $R_1$ denotes a hydrogen atom or a linear, cyclic or branched $C_1$-$C_{40}$ alkyl group optionally substituted by a halogen atom or a hydroxyl, alkoxy, cyano, amino or epoxy group, such as, for example, acrylic acid, methyl, ethyl, propyl, n-butyl, isobutyl, tert-butyl, 2-ethylhexyl or glycidyl acrylate, hydroxy-alkyl acrylates or acrylonitrile;
methacrylic monomers of formula $CH_2$=$C(CH_3)$—$C$(=$O$)—$O$—$R_2$ where $R_2$ denotes a hydrogen atom or a linear, cyclic or branched $C_2$-$C_{40}$ alkyl group optionally substituted by a halogen atom or a hydroxyl, alkoxy, cyano, amino or epoxy group, such as, for example, methacrylic acid, ethyl, propyl, n-butyl, isobutyl, tert-butyl, 2-ethylhexyl or glycidyl methacrylate, hydroxyalkyl methacrylates or methacrylonitrile;
vinylaromatic monomers, such as, for example, styrene or substituted styrenes, such as α-methylstyrene, monochlorostyrene or tert-butylstyrene.

MMA predominates. Preferably, each branch A includes a proportion by weight of MMA of between 50 and 100%, preferably between 75 and 100%, advantageously between 90 and 100%.

The optional comonomer M is any comonomer which can be copolymerized by the radical route with MMA. It is preferably chosen from:
acrylic monomers of formula $CH_2$=$CH$—$C$(=$O$)—$O$—$R_1$ where $R_1$ denotes a hydrogen atom or a linear, cyclic or branched $C_1$-$C_{40}$ alkyl group optionally substituted by a halogen atom or a hydroxyl, alkoxy, cyano, amino or epoxy group, such as, for example, acrylic acid, methyl, ethyl, propyl, n-butyl, isobutyl, tert-butyl, 2-ethylhexyl or glycidyl acrylate, hydroxyalkyl acrylates or acrylonitrile;
methacrylic monomers of formula $CH_2$=$C(CH_3)$—$C$(=$O$)—$O$—$R_2$ where $R_2$ denotes a hydrogen atom or a linear, cyclic or branched $C_2$-$C_{40}$ alkyl group optionally substituted by a halogen atom or a hydroxyl, alkoxy, cyano, amino or epoxy group, such as, for example, methacrylic acid, ethyl, propyl, n-butyl, isobutyl, tert-butyl, 2-ethylhexyl or glycidyl, hydroxyalkyl methacrylates or methacrylonitrile;
vinylaromatic monomers, such as, for example, styrene, substituted styrenes, α-methylstyrene, monochlorostyrene or tert-butylstyrene;
polyfunctional acrylic monomers which give rise to crosslinking, such as, for example, polyol polyacrylates, alkylene glycol polyacrylates or allyl acrylate, ethylene glycol diacrylate, 1,3-butylene glycol diacrylate or 1,4-butylene glycol diacrylate;
polyfunctional methacrylic monomers which give rise to crosslinking, such as polyol polymethacrylates, alkylene glycol polymethacrylates or allyl methacrylate, ethylene glycol dimethacrylate, 1,3-butylene glycol dimethacrylate or 1,4-butylene glycol dimethacrylate;
vinylaromatic monomers, such as, for example, styrene, substituted styrenes, α-methylstyrene, monochlorostyrene or tert-butylstyrene;
polyfunctional vinylaromatic monomers which give rise to crosslinking, such as, for example, divinylbenzene or trivinylbenzene.

Preferably, M is methyl acrylate, ethyl acrylate, butyl acrylate or 1,4-butanediol dimethacrylate (BDMA). The MMA/comonomer M proportion by weight is between 90/10 and 100/0, preferably between 95/5 and 100/0.

As regards the alkoxyamine, the latter has the general formula $Z(-T)_n$ in which Z denotes a polyvalent group capable of relasing several radical sites after activation. The activation occurs by cleavage of the Z-T covalent bonds. n is an integer greater than 2, preferably of between 2 and 10, advantageously between 2 and 8.

n represents the functionality of the alkoxyamine, that is to say the number of nitroxides T which can be released by the alkoxyamine according to the mechanism:

In the presence of monomer(s), the alkoxyamine activated by heating initiates the polymerization. The preparation of a block copolymer polyM2-polyM1-polyM2 from an alkoxyamine for which n=2 is illustrated in the scheme below. The monomer M1 is first polymerized after activation of the alkoxyamine and then the finished polyM1 block is reactivated to initiate the polymerization of the monomer M2:

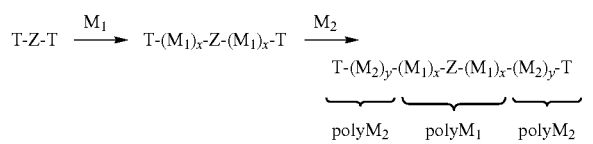

The principle of the preparation of block copolymers remains valid for n>2.

By way of example, Z can be chosen from the following groups (I) to (VIII):

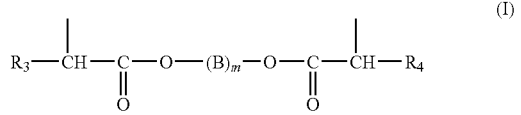

in which $R_3$ and $R_4$, which are identical or different, represent a linear or branched alkyl radical having a number of carbon atoms ranging from 1 to 10, phenyl or thienyl radicals optionally substituted by a halogen atom, such as F, Cl or Br, or else by a linear or branched alkyl radical having a number of carbon atoms ranging from 1 to 4 or else by nitro, alkoxy, aryloxy, carbonyl or carboxyl radicals; a benzyl radical, a cycloalkyl radical having a number of carbon atoms ranging from 3 to 12, a radical comprising one or more unsaturations; B represents a linear or branched alkylene radical having a number of carbon atoms ranging from 1 to 20; m is an integer ranging from 1 to 10;

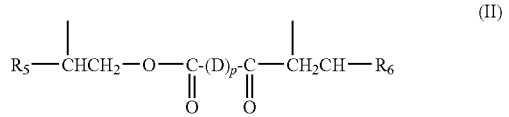

in which $R_5$ and $R_6$, which are identical or different, represent aryl, pyridyl, furyl or thienyl radicals optionally substituted by a halogen atom, such as F, Cl or Br, or else by a linear or branched alkyl radical having a number of carbon atoms ranging from 1 to 4 or else by nitro, alkoxy, aryloxy, carbonyl or carboxyl radicals; D represents a linear or branched alkylene radical having a number of carbon atoms ranging from 1 to 6, a phenylene radical, a cycloalkylene radical; p being an integer ranging from 1 to 10;

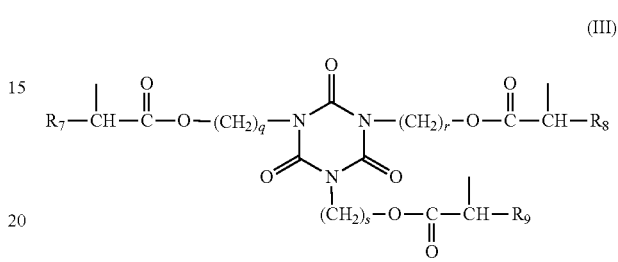

in which $R_7$, $R_8$ and $R_9$, which are identical or different, have the same meanings as $R_3$ and $R_4$ of the formula (I) and q, r and s are integers ranging from 1 to 10;

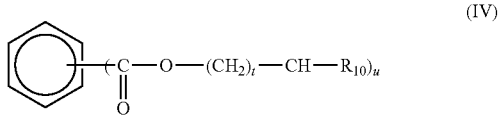

in which $R_{10}$ has the same meaning as $R_5$ and $R_6$ of the formula (II), t is an integer ranging from 1 to 4 and u is an integer of between 2 and 6 (the aromatic group is substituted);

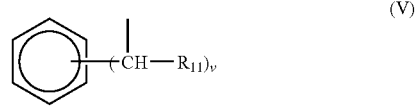

in which $R_{11}$ has the same meaning as the $R_{10}$ radical of the formula (IV) and v is an integer between 2 and 6;

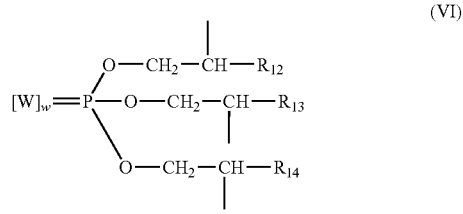

in which $R_{12}$, $R_{13}$ and $R_{14}$, which are identical or different, represent a phenyl radical optionally substituted by a halogen atom, such as Cl or Br, or else by a linear or branched alkyl radical having a number of carbon atoms ranging from 1 to 10, W represents an oxygen, sulphur or selenium atom and w is equal to zero or 1;

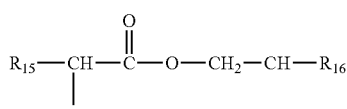

(VII)

in which $R_{15}$ has the same meaning as $R_3$ of the formula (I) and $R_{16}$ has the same meaning as $R_5$ or $R_6$ of the formula (II);

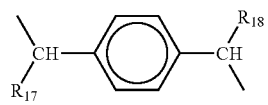

(VIII)

in which $R_{17}$ and $R_{18}$, which are identical or different, represent a hydrogen atom, a linear or branched alkyl radical having a number of carbon atoms ranging from 1 to 10, an aryl radical, optionally substituted by a halogen atom or a heteroatom.

T is a nitroxide, that is to say a stable free radical exhibiting an =N—O• group on which a lone electron is present. The term "stable free radical" denotes a radical so persistent and unreactive with respect to the air and the moisture in the surrounding air that it can be handled and stored for a much longer period of time than the majority of free radicals (see in this respect, *Accounts of Chemical Research*, 1976, 9, 13-19). It is thus distinguished from free radicals having a fleeting lifetime (from a few milliseconds to a few seconds), such as the free radicals resulting from standard polymerization initiators (peroxides, hydroperoxides or azo initiators). The free radicals which are polymerization initiators tend to accelerate the polymerization, whereas the stable free radicals generally tend to slow it down. It may be said that a free radical is stable within the meaning of the present invention if it is not a polymerization initiator and if, under the normal conditions of the invention, the mean lifetime of the radical is at least one minute.

T is represented by the structure:

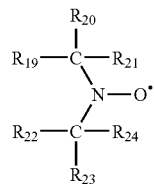

(IX)

in which $R_{19}$, $R_{20}$, $R_{21}$, $R_{22}$, $R_{24}$ and $R_{24}$ denote:

linear or branched $C_1$-$C_{20}$, preferably $C_1$-$C_{10}$, alkyl groups, such as methyl, ethyl, propyl, butyl, isopropyl, isobutyl, tert-butyl or neopentyl, which may or may not be substituted, substituted or unsubstituted $C_6$-$C_{30}$ aryl groups, such as benzyl, aryl(phenyl), saturated $C_1$-$C_{30}$ cyclic groups, and in which the $R_{19}$ and $R_{22}$ groups can form part of an optionally substituted cyclic structure $R_{19}$—CNC—$R_{22}$ which can be chosen from:

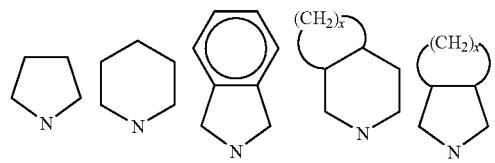

in which x denotes an integer between 1 and 12.

Use may be made, by way of examples, of the nitroxides:

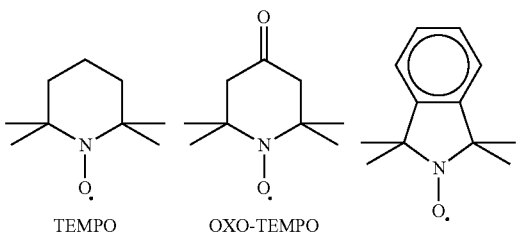

TEMPO      OXO-TEMPO

In a particularly preferred way, the nitroxides of formula (X) are used in the context of the invention since they allow the polymerization to be well controlled:

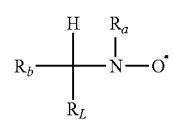

(X)

$R_a$ and $R_b$ denote identical or different alkyl groups having from 1 to 40 carbon atoms which are optionally connected to one another so as to form a ring and which are optionally substituted by hydroxyl, alkoxy or amino groups, $R_L$ denotes a monovalent group with a molar mass of greater than 16 g/mol, preferably of greater than 30 g/mol. The $R_L$ group preferably has a molar mass of between 40 and 450 g/mol. It is preferably a phosphorus group of general formula (XI):

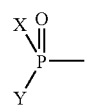

(XI)

in which X and Y, which can be identical or different, can be chosen from alkyl, cycloalkyl, alkoxy, aryloxy, aryl, aralkyloxy, perfluoroalkyl or aralkyl radicals and can comprise from 1 to 20 carbon atoms; X and/or Y can also be a halogen atom, such as a chlorine, bromine or fluorine atom.

Advantageously, $R_L$ is a phosphonate group of formula:

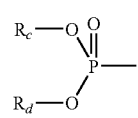

(XII)

in which $R_c$ and $R_d$ are two identical or different alkyl groups, optionally connected so as to form a ring, comprising from 1 to 40 carbon atoms, and optionally substituted or not.

The $R_L$ group can also comprise at least one aromatic ring, such as the phenyl radical or the naphthyl radical, substituted, for example, by one or more alkyl radical(s) comprising from 1 to 10 carbon atoms.

The alkoxyamines of formula (XIII) comprising the nitroxide of formula (X) are preferred:

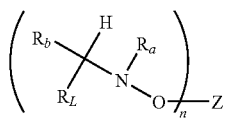

(XIII)

Mention may be made, as examples of nitroxides of formula (X) which can be carried by the alkoxyamine (XIII), of N-tert-butyl-1-phenyl-2-methylpropyl nitroxide, N-(2-hydroxymethylpropyl)-1-phenyl-2-methylpropyl nitroxide, N-tert-butyl-1-dibenzylphosphono-2,2-dimethylpropyl nitroxide, N-tert-butyl-1-di(2,2,2-trifluoroethyl)phosphono-2,2-dimethyl-propyl nitroxide, N-tert-butyl-[(1-diethylphosphono)-2-methylpropyl]nitroxide, N-(1-methylethyl)-1-cyclohexyl-1-(diethylphosphono) nitroxide, N-(1-phenylbenzyl)-[(1-diethylphosphono)-1-methylethyl] nitroxide, N-phenyl-1-diethylphosphono-2,2-dimethylpropyl nitroxide, N-phenyl-1-diethylphosphono-1-methylethyl nitroxide, N-(1-phenyl-2-methylpropyl)-1-diethylphosphonomethylethyl nitroxide, or the nitroxide of formula

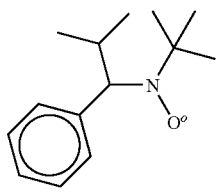

The nitroxide of formula (XIV) is particularly preferred:

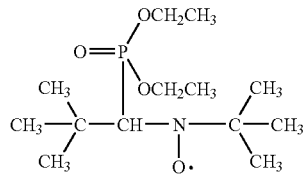

(XIV)

It is N-tert-butyl-1-diethylphosphono-2,2-dimethyl-propyl nitroxide, commonly referred to as SG1 for simplicity.

An alkoxyamine can be prepared by one of the procedures described, for example, in US 590 549 or in FR 99.04405. One method which can be used consists in carrying out the coupling of a carbon radical with a nitroxide. The coupling can be carried out starting from a halogenated derivative in the presence of an organometallic system, such as CuX/ligand (X=Cl or Br), according to a reaction of ATRA (Atom Transfer Radical Addition) type, as described by D. Greszta et al. in *Macromolecules*, 1996, 29, 7661-7670.

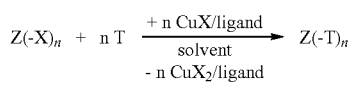

Alkoxyamines which can be used in the context of the invention are represented below:

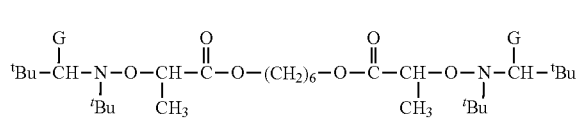

DIAMS

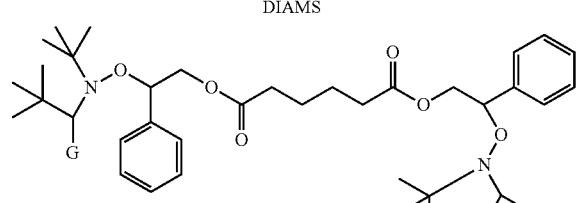

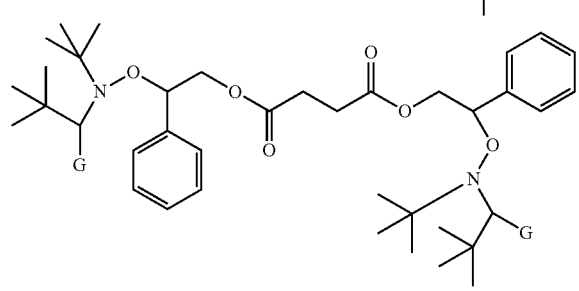

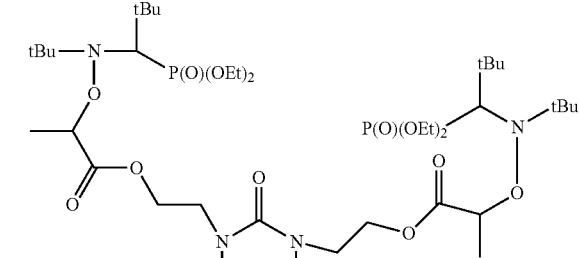

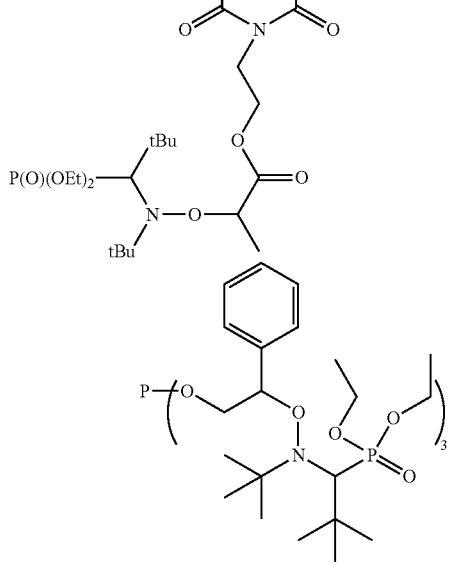

-continued

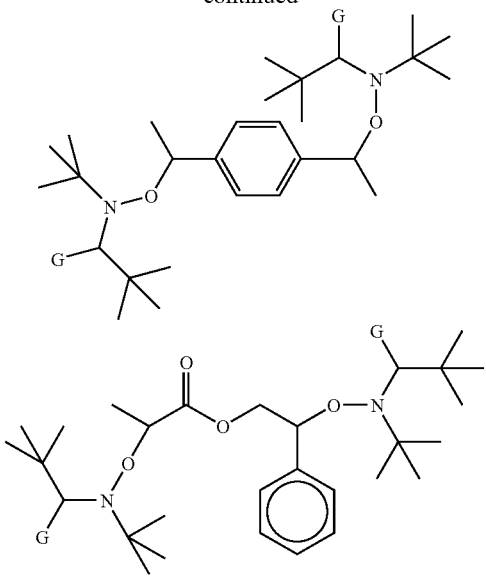

G denotes the —P(═O)(OEt)$_2$ group.

It would not be departing from the scope of the present invention to combine several alkoxyamines. These mixtures might thus comprise, for example, an alkoxyamine having n1 attached nitroxides and an alkoxyamine having n2 attached nitroxides, with n1 different from n2. The combination might also be a combination of alkoxyamines carrying different nitroxides.

As regards the radical initiator, they can be chosen from diacyl peroxides, peroxy esters, dialkyl peroxides, peroxyacetals or azo compounds. The radical initiators which may be suitable are, for example, isopropyl carbonate, benzoyl peroxide, lauroyl peroxide, caproyl peroxide, dicumyl peroxide, tert-butyl perbenzoate, tert-butyl per(2-ethylhexanoate), cumyl hydroperoxide, 1,1-di(tert-butylperoxy)-3,3,5-trimethylcyclohexane, tert-butyl peroxyisobutyrate, tert-butyl peracetate, tert-butyl perpivalate, amyl perpivalate, tert-butyl peroctoate, azobis-isobutyronitrile (AIBN), azobisisobutyramide, 2,2'-azo-bis(2,4-dimethylvaleronitrile) or 4,4'-azobis (4-cyanopentancic. It would not be departing from the scope of the invention to use a mixture of radical initiators chosen from the above list. The preferred radical initiator is azobisisobutyronitrile.

The content of radical initiator with respect to the monomers of the mixture which is cast in the mould varies from 100 to 2000 ppm (by weight), preferably between 200 and 1000 ppm, by weight. This content can vary according to the application targeted and the thickness targeted.

Other ingredients can optionally be added to the mixture which is cast in the mould (during stage 3 of the process according to the invention or stage 1 of the alternative form). Mention may be made, without implied limitation, of organic dyes or inorganic pigments; plasticizers; UV stabilizers, such as Tinuvin® P from Ciba, which is used at contents of 0 to 1000 ppm and preferably 50 to 500 ppm with respect to the mixture which is cast in the mould; light or heat stabilizers, such as, for example, Tinuvin® 770; antioxidants; flame retardants, such as, for example, tris(2-chloropropyl)phosphate; thickeners, such as, for example, cellulose acetate butyrate; mould-release agents, such as, for example, sodium dioctyl sulphosuccinate, used at contents of 0 to 500 ppm and preferably 0 to 200 ppm with respect to the mixture which is cast in the mould; inorganic or organic fillers (for example, polyamide, PTFE, BaSO$_4$) intended to scatter light (for example, to give sheets which can be edge-lit) or to opacify the sheet. These fillers are generally used in the form of premanufactured pastes in a plasticizer of dialkyl phthalate type; at least one additive having the role of reflecting infrared radiation and/or one additive having the role of blocking UV radiation.

The other ingredient can also be a chain-limiting agent commonly used in the field of cast sheets, for example γ-terpinene or terpinolene, at contents of between 0 and 500 ppm and preferably between 0 and 100 ppm, with respect to the monomers of the mixture which is cast in the mould. The chain-limiting agent can also be added before the formation of the branches A (during stage 2 of the process according to the invention) at contents of between 0 and 500 ppm and preferably between 0 and 100 ppm, with respect to the monomer(s) intended to form the branches A.

The impact strengthening according to the invention is produced by virtue of the copolymer B(-A)$_n$ but the addition in synergy of an impact modifier, for example of the core-shell type, is not ruled out, in particular of the soft-hard or hard-soft-hard type (for example sold under the Durastrength® or Metablend® (for example, D320) trade marks of Arkema). The impact modifier/block copolymer B(-A)$_n$ proportion can thus be between 90/10 and 10/90. Preferably, the copolymer B(-A)$_n$ is used alone and no additive of core-shell type is added.

As regards the process, the latter comprises the following stages:

During the 1st stage, a mixture comprising at least one alkoxyamine Z(-T)$_n$ and the monomer(s) intended to form the central block B is heated to a temperature sufficient to activate the alkoxyamine and to polymerize the monomer(s).

The temperature is chosen so as to activate the alkoxyamine while retaining the living character of the controlled radical polymerization. Preferably, it is between 80 and 150° C., advantageously between 80 and 130° C. This temperature is specific to the alkoxyamine used and to the monomer(s) to be polymerized. The duration of the polymerization can vary between 30 minutes and 8 hours, preferably between 1 and 8 hours, advantageously between 2 and 6 hours.

It is possible to also add nitroxide to the mixture in order to provide better control of the polymerization. The nitroxide which is added may be identical to that which is carried on the alkoxyamine or different. The molar proportion of the nitroxide added with respect to the alkoxyamine is between 0 and 20%, preferably between 0 and 10%.

The conversion of the monomer(s) can vary between 10 and 100%. However, preferably, the polymerization is halted for a conversion of between 50 and 100% and advantageously between 50 and 80%.

On conclusion of this 1st stage, the central block B, optionally mixed with the unconsumed monomer(s), is obtained.

During the 2nd stage, the central block B, optionally mixed with the unconsumed monomer(s), from the 1st stage is reactivated in the presence of the monomer(s) intended to form the branches A.

If the conversion of the 1st stage is less than 100%, the not completely polymerized monomer(s) from the 1st stage may be found in the mixture. The mixture thus comprises the central block B, the monomer(s) intended to form the branches A which has/have been added and possibly the monomer(s) not completely polymerized in the 1st stage. The proportion of central block B in this mixture is between 1 and 20%, preferably between 1 and 15% and advantageously between 2 and 10% by weight.

The branches A are formed at a temperature of between 80 and 150° C., preferably between 80 and 130° C. The duration of the polymerization can vary between 30 minutes and 8 hours, preferably between 1 and 4 hours, advantageously between 1 and 2 hours. As during stage 1, it is preferable to avoid the presence of oxygen. It is possible to add nitroxide during this stage, it being possible for this nitroxide to be different from that carried by the alkoxyamine. The proportion of nitroxide added at this stage is between 0 and 20 mol %, preferably between 0 and 10 mol %.

During the 2nd stage, the conversion can vary between 10 and 100%. However, in order not to obtain an excessively viscous mixture, it is preferable to limit the conversion to between 5 and 50%, preferably between 5 and 30%, so that the mixture obtained on conclusion of this 2nd stage comprises the block copolymer $B(-A)_n$ mixed with the unconverted monomer(s). This mixture is commonly referred to as "syrup".

During the 3rd stage, MMA and optionally at least one other monomer M and at least one radical initiator are added to the mixture obtained in the 2nd stage.

On conclusion of the 3rd stage, a mixture comprising MMA, the copolymer $B(-A)_n$, at least one radical initiator and optionally at least one comonomer M is obtained. It may be that monomers unconsumed in the 1st and/or 2nd stages remain, along with possible chain-limiting agents. MMA is predominant.

Stages 1-3 can be carried out in a reactor which can be closed or open. It can be the same reactor for the 3 stages. It is preferable to avoid the presence of oxygen. To do this, the reaction mixture is generally degassed under reduced pressure and the reactor is rendered inert by being flushed with nitrogen or with argon after introducing the reactants.

During the 4th stage, the mixture from the 3rd stage is cast in a mould and then heated. The mould is formed of two glass sheets separated by a seal made of PVC, for example. The heating can, for example, consist in using a vessel filled with water or a ventilated oven in which the moulds with their mixture are placed in a row and which has a temperature which is modified.

As regards the alternative form of the process, the latter comprises the following stages:

During the 1st stage, a block copolymer $B(-A)_n$ is mixed with MMA and with optionally at least one comonomer M and at least one radical initiator.

The block copolymer can preferably be reactivated (that is to say that, when it is heated in the presence of monomer(s), it initiates the polymerization of the monomer(s). Preferably, the proportion of central block B in this mixture is, by weight, between 2 and 5%, preferably between 2.5 and 4.5%, more advantageously still between 2.6 and 4.0%.

The mixture comprises MMA, the copolymer $B(-A)_n$, at least one radical initiator and optionally at least one comonomer M. The block copolymer $B(-A)_n$ is said to be reactivatable.

During the 2nd stage, the mixture obtained in the 1st stage is cast in a mould and then it is heated in order to obtain a cast sheet.

According to the invention or its alternative form, the heating of the mixture cast in the mould can be carried out at a constant temperature (isotherm) or else it can follow a very precise temperature programme, for example a first stationary phase at approximately 70° C., followed by a second stationary phase at about 120° C. After cooling, the sheet obtained is removed from the mould.

The process of the present invention is applicable to the production of industrial acrylic sheets of various thicknesses, advantageously between 2 and 30 mm, preferably from 2.5 to 12 mm. A person skilled in the art knows how to adapt the manufacturing process, in particular as regards the 3rd stage (choice of the radical initiator and of the temperature programme), according to the thickness of the acrylic sheet.

As regards the MMA homo- or copolymer, the latter is formed during the 4th stage of the process according to the invention and during the 2nd stage according to the alternative form. It is predominantly composed of MMA.

As regards the cast sheet, the latter comprises an MMA homo- or copolymer which constitutes the matrix in which the block copolymer $B(-A)_n$ is homogeneously dispersed. The block copolymer has a tendency to settle down inside the matrix to give homogeneously distributed particles. The matrix thus constitutes a continuous phase of MMA homo- or copolymer. The particles, visible using electron microscopy or an atomic force microscope, exist in the form of substantially spherical nodules inside which one or more subnodule(s), having the same composition. as the MMA homo- or copolymer, are present. The cast sheet is thus composed of MMA homo- or copolymer in which particles of block copolymer $B(-A)_n$, existing in the form of substantially spherical nodules inside which one or more subnodule(s) having the same composition as the MMA homo- or copolymer are present, are homogeneously dispersed.

The size of the particles is of the order of 100-600 nm, preferably 100-400 nm, advantageously 100-250 nm. The particle size distribution can be more or less broad.; however, it is advantageous to have a narrow particle size distribution.

In the case of acrylic materials, an important criterion is the transparency/impact strength compromise. In Table 5 of WO 03/062293, the process for the manufacture of cast sheets which is described shows that the increase in the content of central block B makes it possible to improve the impact strength of the sheet but at the expense of its transparency. The process of the present invention makes it possible to obtain a better transparency/impact. strength compromise than with the process of WO 03/062293. This is because it has been found, with surprise, that the transparency/impact strength compromise is optimum for a content of central block B in the sheet of between 2 and 5%, preferably between 2.5 and 4.5%, more advantageously still between 2.6 and 4.0%.

Furthermore, it has also found that the transparency of the impact-strengthened cast sheets according to the process described is less sensitive to the temperature than a cast sheet reinforced using particles of core-shell type.

Use of the Cast Sheets According to the Invention

The sheets manufactured can be used in the manufacture of window panes (in particular in car windows, such as front, rear, side or transparent roof windows), soundproof walls, flat screens, billboard or display devices, and the like, or else can be converted to various articles by thermoforming, cutting out, polishing, adhesive bonding or folding. These sheets can be used in particular to manufacture bathroom fittings (baths, sinks, shower trays, and the like). For this, the sheets are thermoformed in a way known to a person skilled in the art.

In the case of car windows, the sheets can advantageously comprise at least one additive having the role of reflecting infrared radiation and/or one additive having the role of blocking UV radiation.

EXAMPLES

Atomic force microscopy

The morphologies of the sheets were observed microscopically by atomic microscopy (in tapping mode) after surface improvement with a diamond knife and at a temperature of −60° C. Only the images in phase mode, sensitive to the viscoelastic properties of the material, are given.

Gel Permeation Chromatography (GPC)

The molecular masses ($M_n$: number-average, $M_w$: weight-average) were determined using gel permeation chromatography with respect to a PMMA standard.

Other Measurements

The impact strength was determined according to Standard EN 179-2 eU (unnotched Charpy impact, total energy of 2 J and impact speed of 2.9 m·s$^{-1}$). The impact strength is expressed in kJ/m$^2$.

The optical characteristics were determined using a Datacolor Spectraflash calorimeter. The Vicat temperatures were obtained using a Ceast device according to Standard ISO 306.

Example 1

Manufacture of a Strengthened Cast Sheet

1st Stage: Preparation of a Central Block B Based on Butyl Acrylate and on Styrene The following are introduced into a 15 liter metal reactor equipped with a double-helix agitator, with a jacket for heating by circulation of oil, and with a vacuum/nitrogen line: 6880 g of butyl acrylate, 1120 g of styrene, 55 g of dialkoxyamine DIAMS (with a purity of 82% and with a content of free SG1 of 0.48%), i.e. 45 g of pure DIAMS, 1.6 g of SG1 with a purity of 85% (i.e., 1.4 g of pure SG1), which represents a 5 mol % excess per alkoxy functional group carried by the DIAMS, taking into account the 0.48% of free SG1 already present in the DIAMS.

After the introduction of the reactants, the reaction mixture is degassed three times using a vacuum/nitrogen cycle. The reactor is then closed and then stirring (50 rev/min) and heating (set temperature: 125° C.) are begun. The temperature of the reaction mixture reaches 115° C. in approximately 30 min. The pressure stabilises at approximately 1.45 bar. The temperature of the reactor is kept stationary at 115° C. for 250 min. After cooling, 8008 g of a mixture with a solids content of 71%, that is to say a 71% solution of butyl acrylate/styrene copolymer in the excess butyl acrylate, are recovered. The butyl acrylate/styrene ratio by weight of the central block B obtained is 80.3/19.7. Analysis of the central block B by size exclusion chromatography gives the following results: $M_n$: 69 750 g/mol; $M_w$: 124 830 g/mol; polydispersity: 1.8.

2nd Stage: Preparation of the B(-A)$_n$ copolymer from the Preceding Central Block B The following are introduced into a 15 liter metal reactor equipped with an agitator comprising two counter-rotating helices, with a jacket for heating with circulation of oil, and with a vacuum/nitrogen line: 493 g of the 71% solution from the 1st stage, 4504 g of unstabilized MMA (MMA), 5 g of a 5% solution of γ-terpinene in MMA (i.e. 50 ppm of γ-terpinene with respect to the mixture).

After introduction of the reactants, the reaction mixture is degassed three times under vacuum/nitrogen. The reactor is then closed and then stirring (50 rev/min) and heating (set temperature: 90° C.) are begun. The temperature of the reaction mixture reaches 85° C. in approximately 30 min. The duration of the test is counted started from this point. The pressure stabilises at approximately 1.6 bar. The temperature of the reactor is kept stationary at approximately 90° C. for 25 min. 4950 g of an 18% syrup of block copolymer are recovered. The ratio by weight of the PMMA branches with respect to the central block of butyl acrylate-styrene copolymer is 1.6.

3rd Stage: Preparation of a PMMA Sheet with a Thickness of 4 mm from the Syrup of the 2nd Stage The following are poured into a conical vacuum flask: 80 g of the syrup obtained in the 2nd stage, 85 g of unstabilized MMA, 3.0 g of a 5% solution of azobisisobutyronitrile in MMA (i.e. a content of AIBN of 900 ppm with respect to the mixture), 1.7 g of a 1% solution of γ-terpinene in MMA (i.e. a content of γ-terpinene of 100 ppm with respect to the mixture).

The constituents are mixed and then carefully degassed under vacuum for at least 20 min. The mixture is then poured into a mould with dimensions of 200×200×4 mm composed of two glass sheets equipped with an elastomer seal. The mould is then introduced into an oven with programmable air circulation. Polymerization is carried out for 6 hours at a temperature of 70° C.

After cooling, an impact-strengthened PMMA sheet is recovered which has the following characteristics: thickness: 4 mm, easy removal from the mould, the surface is smooth and glossy. The content of central block B in the sheet: 3.4% by weight. Its GPC characteristics are: $M_w$: 1 112 115 g/mol; poly-dispersity: 3.2.

The sheet is transparent and show no yellowing. The calorimetric characteristics in transmission are as follows: L*: 96.81/a*: 0.06/b*: 0.13, Haze: 0.87, Yellow index YIE 313: 0.29, White index WIE 313: 91.4, Transmission at 550 nm: 91.98, impact strength: 28.4±0.8 kJ/m$^2$ Vicat temperature: 108.5° C.

Example 2

Preparation of Strengthened Cast Sheets Comprising Several Contents of Central Block B 1st Stage: Preparation of a Central Block B Based on Butyl Acrylate and on Styrene The following are introduced into a 2 liter metal reactor equipped with a helical agitator, with a jacket for heating by the circulation of oil, and with a vacuum/nitrogen line: 616 g of butyl acrylate, 84 g of styrene, 2.4 g of dialkoxyamine DIAMS (with a purity of 94% and with a free SG1 content of 0.35%), i.e. 2.3 g of pure DIAMS, 0.09 g of SG1 with a purity of 85% (i.e. 0.077 g of pure SG1), which represents a 5 mol % excess per alkoxy functional group carried by the DIAMS, taking into account the 0.35% of free SG1 already present in the DIAMS.

After introduction of the reactants, the reaction mixture is degassed three times under vacuum/nitrogen. The reactor is then closed and then stirring (50 rev/min) and heating (set temperature: 125° C.) are begun. The temperature of the reaction mixture reaches 113° C. in approximately 30 min. The pressure stabilises at approximately 1.5 bar. The temperature of the reactor is kept stationary at 115° C. for 522 min. After cooling, 608 g of a mixture with a solids content of 67% are recovered. The excess butyl acrylate is subsequently removed by evaporation at 70° C. under reduced pressure for 3 h and replaced by 700 g of MMA. 1110 g of a 37% solution in MMA of a stripped macroradical (freed from its excess butyl acrylate) are thus recovered. The butyl acrylate/styrene ratio by weight of the macroradical obtained is 83:17. GPC analysis of the central block B gives the following results: $M_n$: 96 430 g/mol; $M_w$: 201 000 g/mol; polydispersity: 2.1.

2nd Stage: Preparation of a Syrup Comprising a Triblock Prepared from the Preceding Macroradical.

The following are introduced into the reactor already used for stage 1: 132 g of the 37% solution in MMA of the macroradical from stage 1, 566 g of unstabilized MMA, 0.7 g of a 5% solution of γ-terpinene in MMA (50 ppm of γ-terpinene).

After introduction of the reactants, the reaction mixture is degassed three times under vacuum/nitrogen. The reactor is then closed and then stirring (50 rev/min) and heating are begun. The temperature of the reaction mixture reaches 85° C. in approximately 15 min. The duration of the test is counted starting from this point. The pressure stabilises at approximately 1.5 bar. The temperature of the reaction mixture is kept stationary at approximately 90° C. for 55 min. At the end of the test, after cooling, 620 g of a 15.6% syrup of block copolymer are recovered. Branches/block B ratio by weight of the copolymer obtained: 1.22.

3rd Stage: Preparation of a Series of Impact-Strengthened Sheets with a Thickness of 4 mm from the syrup of example 2.

Sheets are manufactured from the mixtures which are described in Table I. The mixtures are stirred, degassed under vacuum and then poured into moulds according to a procedure identical to that described in Example 1.

TABLE 1

| | Sheet 2 invention | Sheet 3 invention | Sheet 4 invention | Sheet 5 invention | Sheet 6 comparative |
|---|---|---|---|---|---|
| Syrup from stage 2 [%] | 99.9 | 89.9 | 69.9 | 49.9 | 0 |
| AIBN [ppm] | 900 | 900 | 900 | 900 | 900 |
| γ-Terpinene [ppm] | 100 | 100 | 100 | 100 | 100 |
| Unstabilized MMA (%) | 0 | 10 | 30 | 50 | 100 |

The moulds are then introduced in a horizontal position into an oven with programmable air circulation. Polymerization is carried out at 70° C. for 7 hours. PMMA sheets which can be easily removed from the moulds are recovered and have the following characteristics:

TABLE II

| Sheet | Content of block B in the sheet [%] | Haze [%] | Vicat [° C.] | Residual MMA [%] | Impact strength [kJ/m$^2$] |
|---|---|---|---|---|---|
| 2 (inv.) | 6.8 | 9.8 | | | 29.5 |
| 3 (inv.) | 6.1 | 3.7 | 110.7 | 1.2 | 31.0 |
| 4 (inv.) | 4.8 | 2.9 | | 1.1 | 41.8 |
| 5 (inv.) | 3.4 | 2.5 | 108.5 | 1 | 41.3 |
| 6 (comp.) | 0 | 1 | 116.0 | <1 | 12.0 |

It is observed that the impact strength of the sheets does not increase uniformly with the content of central blocks in the sheet. The strength is maximal for a content of central block of between 3.4 and 4.8% for a transparency which is very good (haze of 2.5%). The low content of residual MMA will also be noted.

Figure 2:
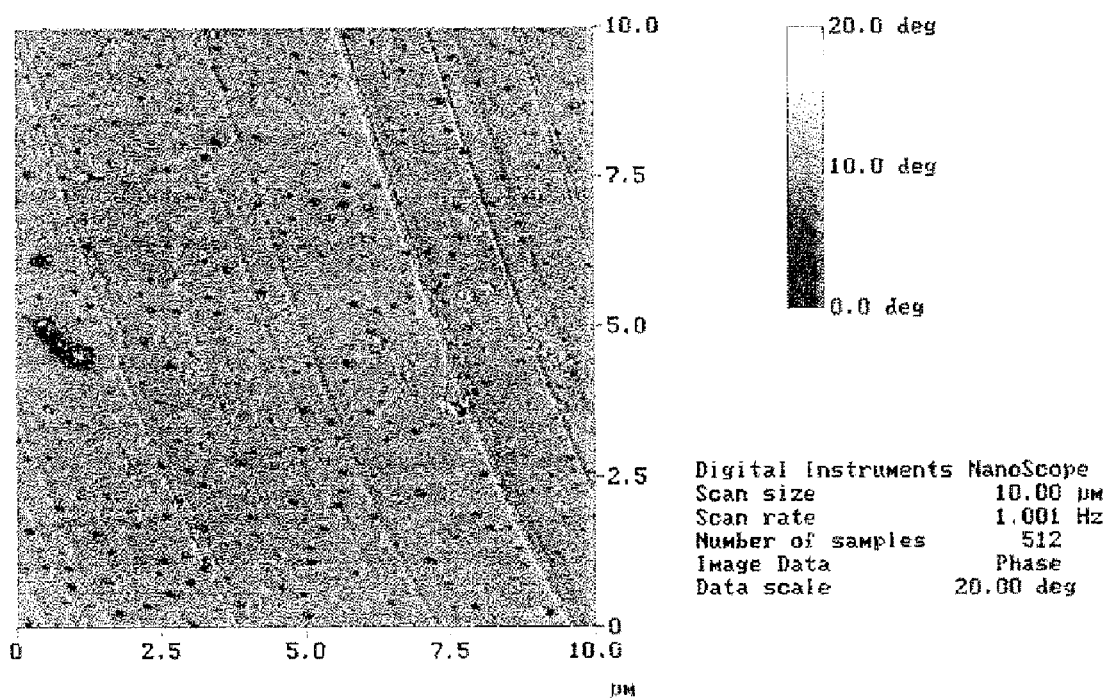
FIGS. 2 and 3: are atomic force microscopy images of Sheet 4 of the Examples.
Figure 3:
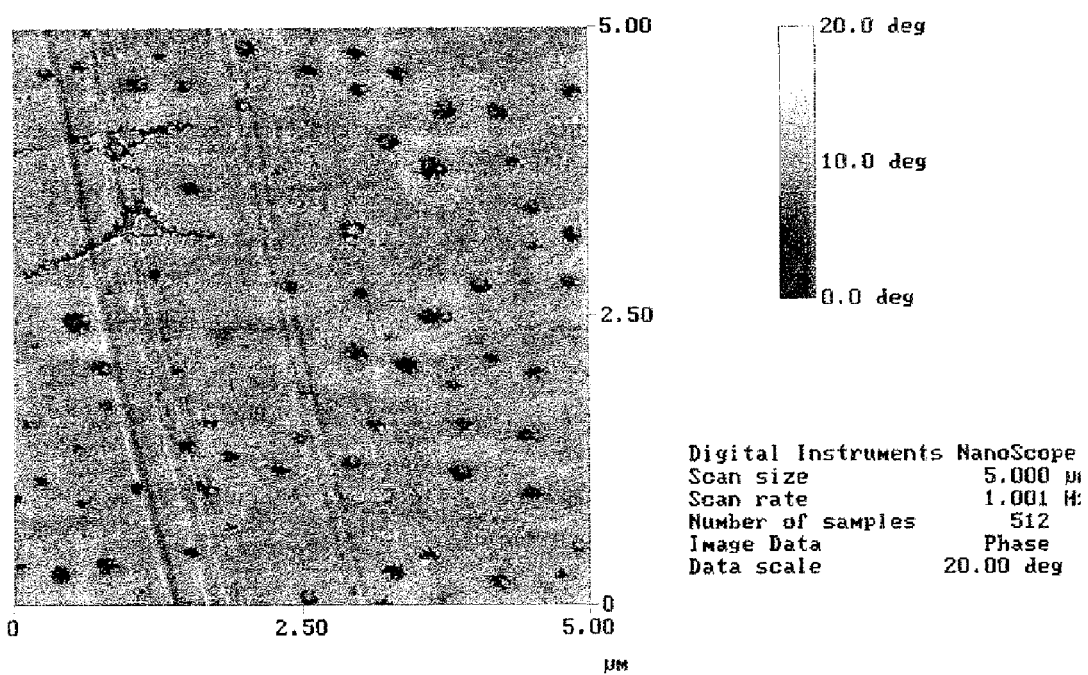

Sheets 2 and 4 were studied using an atomic force microscope (AFM). FIG. 1 represents an AFM image of sheet 2. FIGS. 2 and 3 represent AFM images of sheet 4. For both sheets, the presence of uniformly distributed substantially spherical particles is noted in the images. The particles are nodules within which subnodules are present. The particles of sheet 2 have a size of the order of 300-500 nm. Those of sheet 4 have a size of the order of 100-200 nm.

Influence of the Temperature on the Transparency

The transparency (haze H in %) as a function of the temperature T (in ° C.) was also measured for the cast sheet 5 (curve 1) and for a cast sheet obtained from a commercial impact modifier, the grade ZK 6BR sold by Roehm Gmbh (curve 2).

Figure 4:
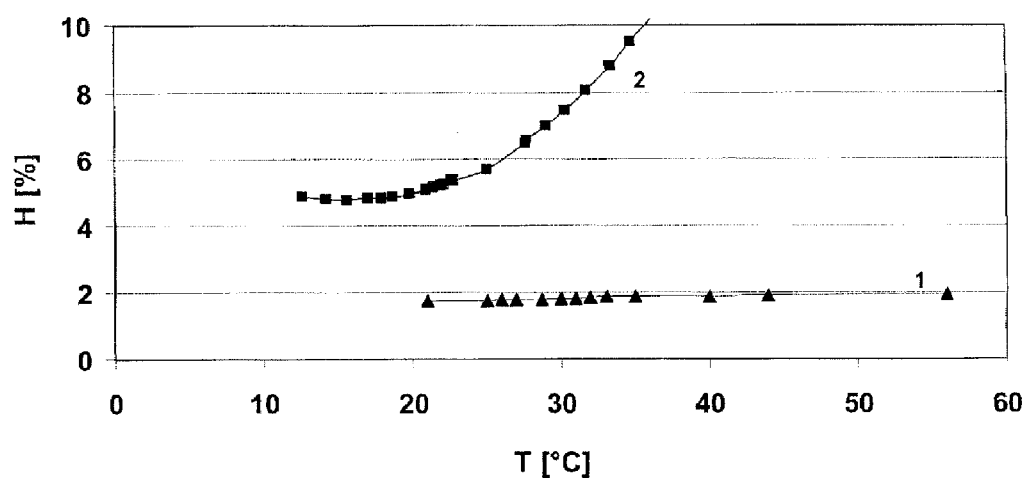
FIG. 4: plots transparency as a function of temperature for Sheet 5 of the invention (curve 1) compared to a Commercial sheet (curve 2)

It is found that the haze is not greatly influenced by the temperature over the curve 1, but the influence is much more substantial for the curve 2 See FIG. 4.

The invention claimed is:

1. Process for the preparation of impact-strengthened cast PMMA sheets comprising the following stages:
   1) heating a mixture comprising:
      at least one alkoxyamine $Z(-T)_n$, in which Z denotes a polyvalent group and n is an integer greater than 2, and
      the monomer(s) intended to form a central block B
      to a temperature sufficient to activate the alkoxyamine and polymerize the monomer(s);
   2) reactivating the central block B, optionally mixed with the unconsumed monomer(s) from stage 1, in the presence of the monomer(s) intended to form the branches A;
   3) adding methylmethacrylate (MMA) and optionally at least one comonomer M which can be copolymerized by the radical route with methyl methacrylate (MMA) and at least one radical initiator to the mixture obtained in stage 2;
   4) casting the mixture from stage 3 in a mould and then heating,
   to form an impact-strengthened cast PMMA sheet,
   wherein no desolventization step occurs between steps 2) and 3).

2. Process according to claim 1, in which the central block B exhibits an overall glass transition temperature of less than 0° C.

3. Process according to claim 1, in which each branch A exhibits an overall glass transition temperature of greater than 0° C.

4. Process according to claim 1, in which each branch A is prepared from a mixture comprising MMA and optionally at least one monomer chosen from:
   acrylic monomers of formula $CH_2$=CH—C(=O)—O—$R_1$ where $R_1$ denotes a hydrogen atom or a linear, cyclic or branched $C_1$-$C_{40}$ alkyl group optionally substituted by a halogen atom or a hydroxyl, alkoxy, cyano, amino or epoxy group;
   methacrylic monomers of formula $CH_2$=C($CH_3$)—C(=O)—O—$R_2$ where $R_2$ denotes a hydrogen atom or a linear, cyclic or branched $C_2$-$C_{40}$ alkyl group optionally substituted by a halogen atom or a hydroxyl, alkoxy, cyano, amino or epoxy group;
   vinylaromatic monomers.

5. Process according to claim 1, in which the group Z is:

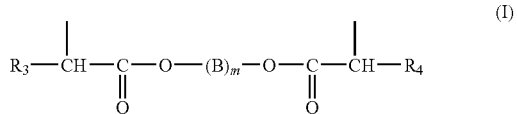

(I)

in which $R_3$ and $R_4$, which are identical or different, represent a linear or branched alkyl radical having a number of carbon atoms ranging from 1 to 10, phenyl or thienyl radicals optionally substituted by a halogen atom, or else by a linear or branched alkyl radical having a number of carbon atoms ranging from 1 to 4 or else by nitro, alkoxy, aryloxy, carbonyl or carboxyl radicals; a benzyl radical, a cycloalkyl radical having a number of carbon atoms ranging from 3 to 12, a radical comprising one or more unsaturations; B represents a linear or branched alkylene radical having a number of carbon atoms ranging from 1 to 20; m is an integer ranging from 1 to 10.

6. Process according to claim 1, in which the nitroxide T has the formula:

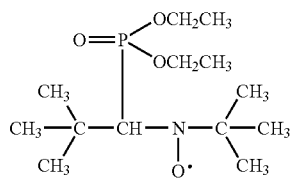

(XIV)

7. The process of according to claim 1 wherein in said alkoxyamine $Z(-T)_n$, Z denotes a polyvalent group and n is an integer of between 2 and 10.

8. The process of claim 1, wherein said impact-strengthened cast PMMA sheet contains a level of residual MMA of 1.2 weight percent or less.

9. Process according to claim 1, in which the central block B is prepared from a mixture comprising at least one monomer selected from the group consisting of:
   acrylic monomers of formula $CH_2=CH-C(=O)-O-R_1$ where $R_1$ denotes a hydrogen atom or a linear, cyclic or branched $C_1-C_{40}$ alkyl group optionally substituted by a halogen atom or a hydroxyl, alkoxy, cyano, amino or epoxy group;
   methacrylic monomers of formula $CH_2=C(CH_3)-C(=O)-O-R_2$ where $R_2$ denotes a hydrogen atom or a linear, cyclic or branched $C_1-C_{40}$ alkyl group optionally substituted by a halogen atom or a hydroxyl, alkoxy, cyano, amino or epoxy group;
   vinylaromatic monomers.

10. The process of claim 9, wherein:
   a) said acrylic monomers of formula $CH_2=CH-C(=O)-O-R_1$, are selected from acrylic acid; methyl, ethyl, propyl, n-butyl, isobutyl, tert-butyl, 2-ethylhexyl or glycidyl acrylate; hydroxyalkyl acrylates; or acrylonitrile;
   b) said methacrylic monomers of formula $CH_2=C(CH_3)-C(=O)-O-R_2$ are selected from methacrylic acid; methyl, ethyl, propyl, n-butyl, isobutyl, tert-butyl, 2-ethylhexyl or glycidyl methacrylate; hydroxyalkyl methacrylates; or methacrylonitrile; and
   c) said vinylaromatic monomers, are selected from, styrene, substituted styrenes, α-methylstyrene, monochlorostyrene or tert-butylstyrene.

11. Process according to claim 1, in which the nitroxide T is represented by the structure:

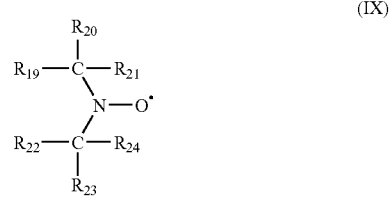

(IX)

in which $R_{19}$, $R_{20}$, $R_{21}$, $R_{22}$, $R_{24}$ and $R_{24}$ denote:
   linear or branched $C_1-C_{20}$, preferably $C_1-C_{10}$, alkyl groups, which may or may not be substituted,
   substituted or unsubstituted $C_6-C_{30}$ aryl groups,
   saturated $C_1-C_{30}$ Cyclic groups,
and in which the $R_{19}$ and $R_{22}$ groups can form part of an optionally substituted cyclic structure $R_{19}-CNC-R_{22}$ which can be chosen from:

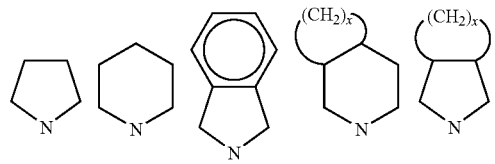

in which x denotes an integer between 1 and 12.

12. Process according to claim 11, in which the nitroxide T has the formula

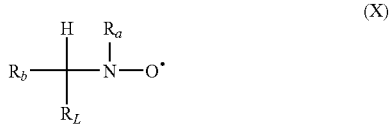

(X)

$R_a$ and $R_b$ denoting identical or different alkyl groups having from 1 to 40 carbon atoms which are optionally connected to one another so as to form a ring and which are optionally substituted by hydroxyl, alkoxy or amino groups and $R_L$ denoting a monovalent group with a molar mass of greater than 16 g/mol.

13. Process according to claim 1, in which the proportion of central block B in the sheet is by weight between 2 and 5.

14. Process according to claim 13, in which the proportion of central block B in the sheet is by weight between 2.5 and 4.5%.

* * * * *